March 18, 1969 F. G. MOLDAVSKY ET AL 3,433,379
GLASS PRESERVING JARS
Filed July 20, 1967
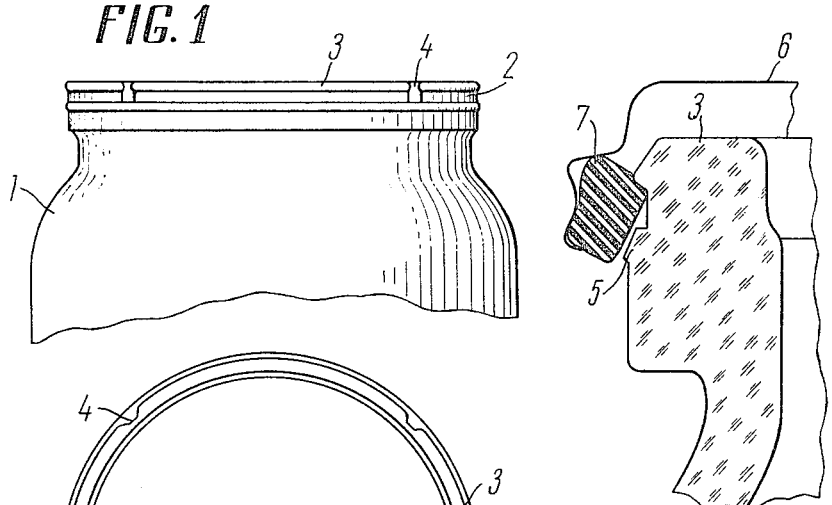
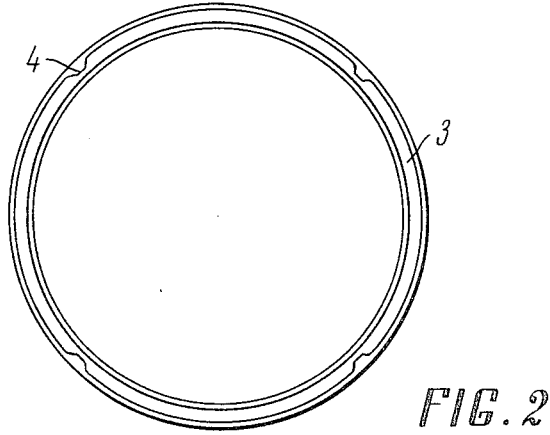

United States Patent Office 3,433,379
Patented Mar. 18, 1969

3,433,379
GLASS PRESERVING JARS
Felix Grigorievich Moldavsky, Proletarsky bulvar 41, kv. 21, and Anatoly Feofanovich, Kotelnikov, Voznesensky perevlok 14, kv. 6, both of Odessa, U.S.S.R.
Filed July 20, 1967, Ser. No. 654,893
U.S. Cl. 215—40  2 Claims
Int. Cl. B65d 1/02, 11/04, 23/00

ABSTRACT OF THE DISCLOSURE

A jar neck having an annual bead at the top edge of the exterior thereof, and an annular shoulder below the said bead. The bead is interrupted at at least one point by a groove so that air and vapor may pass under a sealing ring that holds a closure cap in place during processing of material in the jar. The proportioning of the device being such that prior to processing the sealing ring seals the jar by pressing on the shoulder but, during processing, the cap and sealing ring being raised slightly by internal pressure in the jar, the sealing ring is raised from contact with the shoulder and the pressure from within the jar is relieved by escape through the groove in the bead.

---

The present invention relates to glass preserving jars intended for sterilizing food products.

Preserving jars are known having a cylindrical rim on their necks to be sealed by means of a metal cap provided with a sealing ring.

Sterilization of food products in such jars necessitates the provision of counterpressure to prevent the caps from being torn off the jar neck as a result of an increased inside pressure caused by the escape of an air-and-vapor mixture from the jar.

The creation of said counterpressure complicates the process of sterlization and impedes the change-over to continous flow-type sterilization.

It is an object of the present invention to eliminate these disadvantages.

It is a principal object of the invention to provide a glass preserving jar, which would obviate the necessity for providing counterpressure in the sterilizer and insure deep vacuum inside the jar owing to the escape therefrom of an air-and-vapor mixture during sterilization, in addition to a tighter fit of the cap and, consequently, better sealing.

The invention thus consists in providing a glass preserving jar wherein the side surface of the rim has a circular groove with channels provided in its upper wall, said channels being perpendicular to the groove and open from the side so as to permit the release of the air-and-vapor mixture during sterilization.

The edges of the upper and lower walls of the circular groove may be chamfered so as to form a conical annular surface on the rim.

Other objects and advantages of the invention will be more apparent from the following description thereof and the appended drawings, wherein:

FIG. 1 shows the neck of the jar according to the invention;
FIG. 2 is a plan view of the jar neck; and
FIG. 3 shows the position of the cap on the jar neck when the air-and-vapor mixture escapes from the jar during sterilization.

A glass preserving jar (FIG. 1) has a cylindrical rim with a circular groove 2 provided on its side surface.

The upper wall 3 of the circular groove 2 has channels 4 perpendicular to the groove 2 and disposed uniformly about the jar neck.

The edges of the upper and lower walls 3 and 5 (FIG. 3) of the groove 2 are chamfered so as to form conical annular surfaces on the rim of the jar neck, said conical annular surfaces insuring a tighter fit of the cap 6 with an elastic ring 7 on the neck of the jar 1, and consequently, a better seal of said jar during sterilization.

The cap 6 with the elastic ring 7, being placed on the rim of the glass preserving jar 1, rises during the sterilization due to the inside pressure and thus compresses the elastic ring 7. From the jar 1 the air-and-vapor mixture goes to the circular groove 2 through the channels 4, from where it leaks to the atmosphere through a gap between the elastic ring 7 and the lower wall 5 of the groove 2 caused by the interior pressure. The jar becoming cooler, the pressure inside it drops, the compressed elastic ring 7 tends to straighten and 6 as the pressure on the outside of the cap 6 becomes greater than the pressure on the inside, the cap moves downwardly, thereby closing the exit for the air-and-vapor mixture. Once the jar is cooled, the vacuum created inside it tightly presses the ring 7 against the lower wall 5 thereby insuring a more dependable seal of the jar 1. When necessary, the cap can be removed by any common lever-type instrument.

What is claimed is:
1. A glass preserving jar having a generally cylindrical neck portion at the jar mouth, an annular groove in said generally cylindrical neck portion to form an annular bead about the exterior of the neck at the jar mouth and to form an annular shoulder on the neck on the side of said groove remote from the jar mouth, said annular bead being provided with interruptions in the form of grooves connecting said annular groove with a space above said annular bead for release of vapor or air pressure past said bead during sterilization of material in the jar.
2. A glass preserving jar as claimed in claim 1 wherein the edges of the annular bead and of the shoulder are chamfered so as to form conical areas on said jar neck.

References Cited
UNITED STATES PATENTS 2,424,801  7/1947  Cralle et al _____ 215—56
2,670,868  3/1954  Storer et al. _____ 215—31
3,011,671  12/1961  Waher _____ 215—56 X GEORGE T. HALL, Primary Examiner.

U.S. Cl. X.R.
213—136; 215—56, 31